United States Patent [19] [11] 4,413,397
McKann [45] Nov. 8, 1983

[54] METAL DOOR AND LIGHT ASSEMBLY

[75] Inventor: H. Smith McKann, Fredericksburg, Va.

[73] Assignee: General Products Company, Inc., Fredericksburg, Va.

[21] Appl. No.: 390,351

[22] Filed: Jun. 21, 1982

Related U.S. Application Data

[62] Division of Ser. No. 178,493, Aug. 15, 1980, abandoned.

[51] Int. Cl.³ .......................... B23P 17/00; B23P 6/00
[52] U.S. Cl. ...................................... 29/416; 29/401.1
[58] Field of Search ...................... 29/401.1, 412, 416; 52/456, 656, 741

[56] References Cited

U.S. PATENT DOCUMENTS 3,004,641 1/1959 Johnson ................................ 189/46
3,487,602 1/1970 Braun et al. .......................... 52/455
3,641,721 2/1972 Martin .................................. 52/212
3,760,543 9/1973 McAllister ............................ 52/397
3,949,526 4/1976 Sherlock et al. ...................... 49/501
3,969,857 7/1976 Stark .................................... 52/208
4,024,691 5/1977 Hansen et al. ........................ 52/656
4,128,977 12/1978 Schubeis .............................. 52/212

*Primary Examiner*—Howard N. Goldberg
*Assistant Examiner*—Steven E. Nichols
*Attorney, Agent, or Firm*—Roylance, Abrams, Berdo & Farley

[57] ABSTRACT

A metal door is provided with a rectangular opening the edges of which are bent to form a ledge. Two half-frame structures are formed from side members and corner pieces which snap into the side members and the half-frames are placed in the opening from opposite sides and held together by threaded fasteners so that the frame does not protrude beyond the door faces. A method of cutting the plates removed from the rectangular opening to obtain all material for side members, corner pieces and muntins is disclosed.

2 Claims, 5 Drawing Figures

METAL DOOR AND LIGHT ASSEMBLY

This application is a division of application Ser. No. 178,493, filed Aug. 15, 1980, now abandoned.

The present invention relates to a light structure for a metal closure such as a door and particularly to a light in which the frame is recessed within the door.

BACKGROUND OF THE INVENTION

It is now common practice to produce doors from sheet metal as replacements or for new construction. When these doors are to be used as outside entrances, as distinguished from interior doors, it is desirable to have one or more window sections, referred to as lights, formed in the door, and several prior patents involve providing a light in a metal door including the following U.S. Pat. Nos.:

| | |
|---|---|
| 3,004,641 | Johnson |
| 3,487,602 | Braun et al. |
| 3,641,721 | Martin |
| 3,760,543 | McAllister |
| 3,969,857 | Stark |
| 4,128,977 | Schubeis |

While these patents appear to provide usable structures, they do not, with one exception, disclose structures which can be used to form a light in which the frame is recessed so that it does not protrude beyond or overlap the major outer door surfaces. In the one exception, Johnson, the techniques for holding the frame in place involve spot welding steps following the assembly of the door itself or involve frame strips which are held only by friction and are therefore not sufficiently secure to be usable in an outside door.

For completeness, reference is also made to U.S. Pat. Nos.:

| | |
|---|---|
| 3,949,526 | Sherlock et al. |
| 4,024,691 | Hanson et al. |

which show, respectively, a corner brace used with extruded plastic tubular members for forming a door frame, and interlocking corner braces used with tubular metal extruded members, also to form a door frame.

BRIEF DESCRIPTION OF THE INVENTION

Accordingly, an object of the present invention is to provide a door light frame structure which is simple and economical to manufacture and install.

A further object is to provide a light frame structure which does not protrude beyond the major surfaces of the door in which it is installed but which is sufficiently secure to serve in an outer door.

Yet another object is to provide a method of providing material for all of the portions for one door panel and a set of frame and muntin members from a single sheet of metal, using the plate cut out of the door to make the opening in the panel as the source for the frame members.

Briefly described, the invention includes a door and light frame structure comprising the combination of a metal door having parallel sheet metal panels forming the major faces of the door; means in each of said panels defining a generally rectangular opening, each side of said opening having a portion of each panel shaped to receive the frame structure and including a first portion bent perpendicular to the panel and extending inwardly toward the opposite panel, the total widths of the first portions at each side being less than the door thickness, and a second flange portion bent perpendicular to the first portion and extending toward the center of the opening; a frame structure including inner and outer separately assembled rectangular half-frames dimensioned to be received in said rectangular openings with a translucent panel sandwiched therebetween, each of said half-frames including four side members of substantially identical cross section and four corner members, each of said side members including, in cross section a flat portion adapted to lie in parallel contiguous relationship with one of said first portions of said opening with the inner distal edge of said flat portion abutting said second flange portion, said flat portion having openings near opposite ends thereof, a face portion extending in a generally perpendicular direction from said flat portion toward the center of the opening; and a third portion extending generally inwardly from said face portion toward the opposite side of the door to abut the translucent panel; each of said corner members including an L-shaped sheet metal member each leg of which is generally U-shaped in cross-section and is dimensioned to be telescopically received in an end of a side member, each leg of said U having a protruding tab for engaging and locking in one of said openings in said flat portion when said leg is fully received in a side member; and fastener means extending between said inner and outer half-frames for urging them toward each other.

In another aspect, the invention includes a method of forming a door panel having an opening to receive a half-frame and muntins and of forming the half-frame and muntin members usable to retain a translucent panel when assembled with a similar door panel and half-frame comprising the steps of cutting a rectangular plate from the door panel to form an opening therein; bending the edges of the door panel around the opening thus formed to provide an L-shaped retaining ledge at each side of the opening; cutting the plate from the door panel along diagonal parallel lines to provide elongated strips of suitable width to provide a pair of horizontal frame members, a pair of vertical frame members, a pair of long muntins and six short muntins; cutting the strips transversely into proper lengths for the frame and muntin members; and bending the frame and muntin members into desired cross-sectional shapes whereby the door panel and frame and muntin members are provided with minimum material waste.

In order that the manner in which the foregoing and other objects are attained in accordance with the invention can be understood in detail, particularly advantageous embodiments thereof will be described with reference to the accompanying drawings, which form a part of this specification and wherein.

Figure 1:
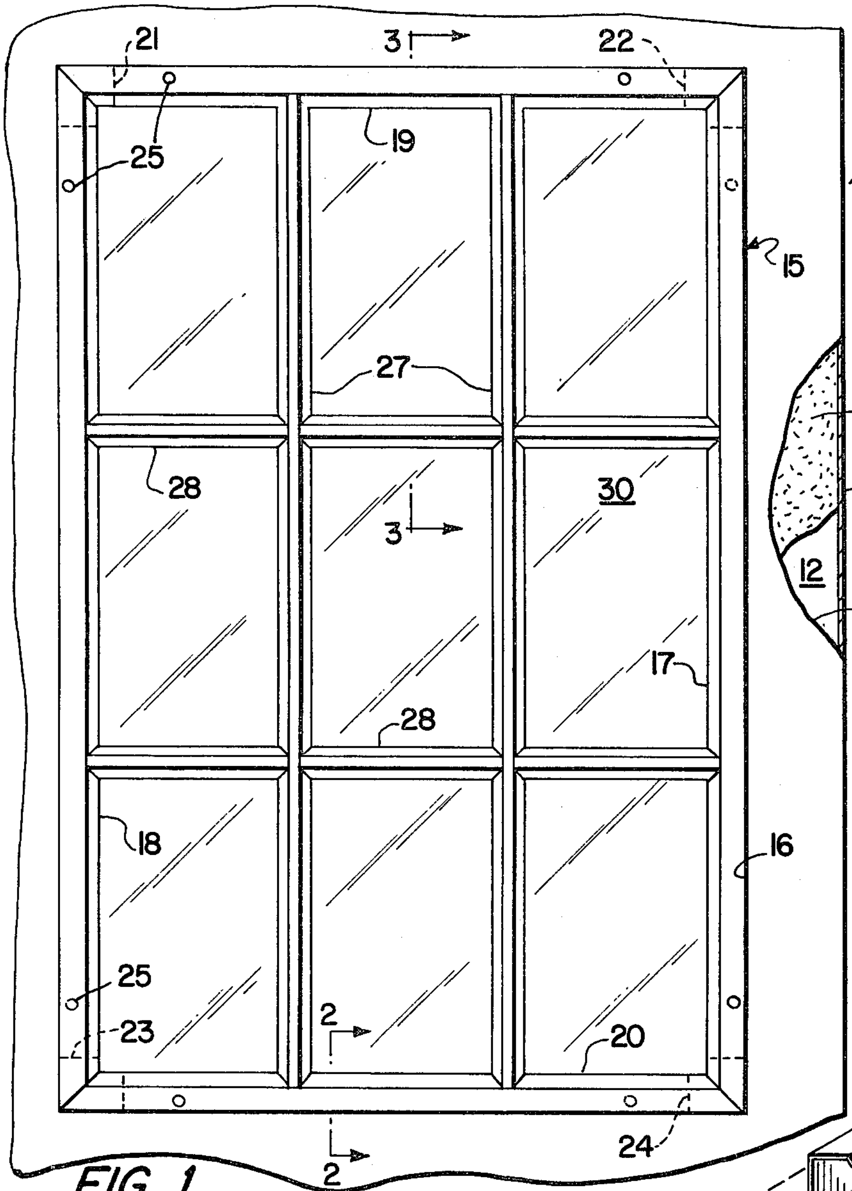
FIG. 1 is a front elevation of a portion of a door and frame assembly in accordance with the invention.

Turning now to the drawings in detail, it will be seen that FIG. 1 shows a portion of a metal door indicated generally at 10, the door including two generally parallel, flat metal sheets forming the major surfaces 11 and 12 of the door, these metal surfaces being either connected by a transverse edge 13, the void within the door being usually filled by a foam material 14. The construction of the door itself is conventional and is not per se a part of the invention and, therefore, will not be described in detail. Of particular interest to the present invention is the provision of a window structure or light indicated generally at 15, the light assembly being mounted at an opening 16 formed in the door. As will be recognized, more than one light can be provided in the door, but for purposes of the present explanation a door having only one light will be considered.

The opening formed in the door is rectangular and is longer in the vertical direction than in the horizontal direction. Thus, the frame assembly of the light includes vertical members side members 17 and 18, top and bottom horizontal side members 19 and 20, and corner brace members 21–24, shown in dotted lines in FIG. 1. Fastener means 25 which will be described in greater detail, hold the assembly together.

Figure 3:
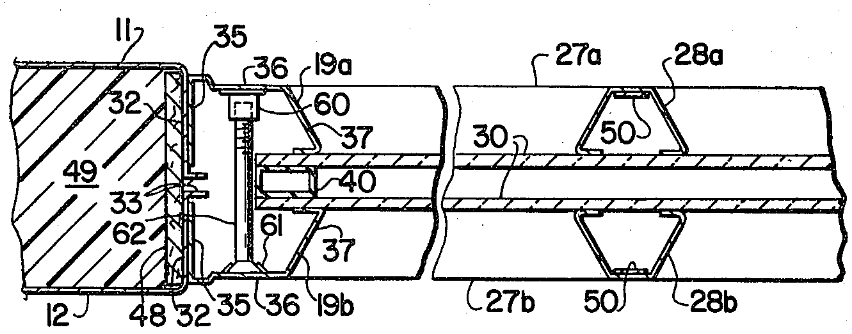
FIG. 3 is a fragmentary sectional view along line 3—3 of FIG. 1.
Figure 2:
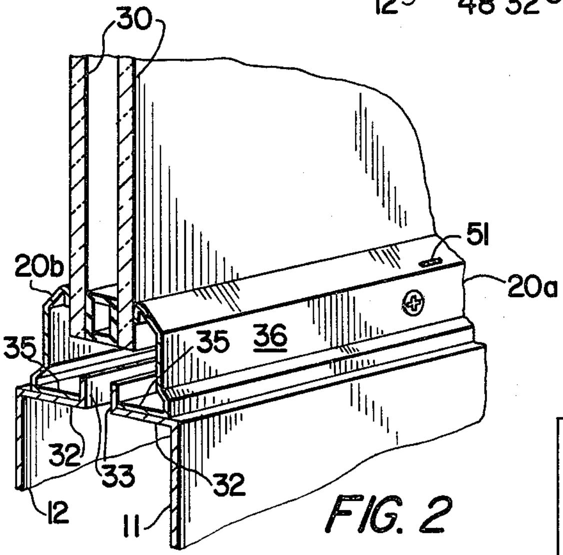
FIG. 2 is a fragmentary perspective sectional view along line 2—2 of FIG. 1.

Also shown in FIG. 1 are vertical and horizontal muntins 27 and 28, respectively. These are so-called "false muntins" which present the appearance of dividing the single pane of glass or other translucent material 30 into small individual panes, but do not actually penetrate the glass. As best seen in FIGS. 2 and 3, the frame assembly in accordance with the present invention is particularly well suited for doubleglazing in which case the panes 30 are both continuous across the muntins.

The sectional view of FIG. 2 illustrates a portion of the front and rear panels 11 and 12 of the door and the bottom frame member 20 which, as illustrated in FIG. 2, consists of a front member **20*a* and a rear member 20*b*. As also seen in FIG. 3, the frame structure includes two half-frame structures which are joined together, sandwiching the glazing therebetween. Thus, the front half-frame structure includes members 17*a*, 18*a*, 19*a*, and 20*a*, and the associated false muntins 27 and 28*a***, while the rear frame structure includes these same elements identified by similar reference numerals with the letter "b". Each halfframe structure includes four corner elements, as will be described in detail, so that each half-frame structure can be individually assembled and placed into the opening formed in the door.

Again, as best seen in FIGS. 2 and 3, the opening in the door is formed by cutting a rectangular plate from each panel 11 and 12 and forming the edges of the opening formed by the removal of the rectangular plate therefrom into a shape suitable for receiving the frame, each such bent edge being bent to provide an inwardly extending perpendicular portion 32 the inner edge of which is again perpendicularly bent to form a flange 33 which extends parallel to the major faces of the panels. It will be observed that the lengths of portions 32, in a direction perpendicular to the major panels, are less than one half of the thickness of the door so that flanges 33 are in parallel, spaced relationship.

The side members of each half-frame structure are all identidentical in cross-section, each such member including a flat portion 35 adapted to lie in parallel, contiguous relationship with one of portions 32 with the distal edges of portion 35 abutting flanges 33. A face portion, the outer surface of which will be exposed as the outer portion of the frame structure, is identified as 36, and extends in a direction generally perpendicular to the flat portion 35. However, it will be recognized that the portions 36 can be configured in any desirable shape so as to present a pleasing appearance. Finally, an inwardly extending portion 37 extends from the inner end of portion 36 toward the glass, the portion 37 conveniently having downwardly turned edges to form surfaces abutting the glass. The ends of each of the side members are preferably mitered at 45° so as to form closely fitting corners.

The glazing itself, consisting of two parallel sheets of glass, can be provided with a continuous gasket 40 of elastomeric material to seal the cavity between the glass, providing an insulating effect as is well known.

Figure 4:
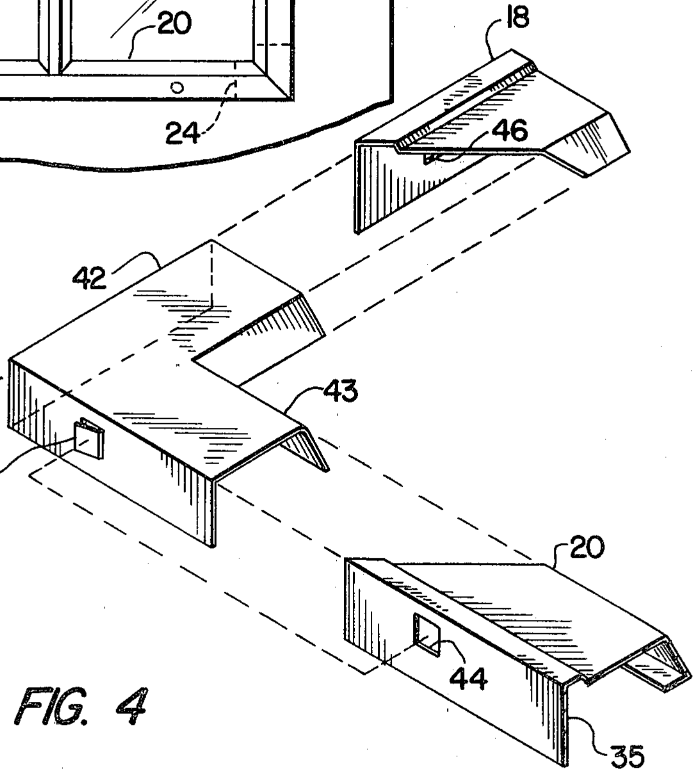
FIG. 4 is fragmentary perspective view of a corner structure of a half-frame usable in the assembly of FIG. 1.

FIG. 4 illustrates a typical corner structure between members of the half-frame assembly, all such corners being identical. The corner between members 18 and 20, which has been chosen for purposes of ilustration, shows the 45° angle miters at the ends of the side members. The corner is held together by an L-shaped corner member indicated generally at 23 which has perpendicular legs 42 and 43, each of which has a generally U-shaped cross-section. The legs are dimensioned and shaped so that the ends are telescopically receivable in their associated side members. As shown in FIG. 4, the flat portion 35 of member 20 is provided with an opening 44 and leg 43 of the corner member 23 is provided with a protruding tab 45, the tab 45 and opening 44 being dimensioned and positioned so that when leg 43 is inserted into the side member the tab is bent in a spring-like fashion inwardly and then snaps into opening 44, substantially filling the opening and locking the members together. As seen in FIG. 4, tab 45 is simply cut and struck outwardly from the material of the corner member itself, and requires no additional material. A similar opening 46 is provided in member 18 and in the flat portion of each other member so that tabs on the associated corner members can be snapped in and locked to the side members in a similar fashion. From this it will be seen that each half-frame, with or without the muntins, can be assembled and then installed in the door after the door itself is formed.

For completeness, it will be noted in connection with FIG. 3 that the door can be provided with a sleeve 48 of cardboard or similar material which is in the form of a short rectangular cylinder placed between the panels before the bending inwardly of portions 32 and 33; and that, after the bending of these portions, a foam material 49 can be placed in the cavity between the panels, providing an insulating characteristic to the door, as is well known in the art. The sleeve prevents the foam from escaping through the gap between flange portions 33.

The muntins themselves are relatively conventional construction. Vertical, long muntins 27 are continuous from the top to the bottom of the light, and muntins 28 are short members which can be placed between the long and side members during installation. Each muntin, as seen in FIG. 3, includes a bent sheet metal member having the shape of a truncated V with short protruding tongues 50 being provided at opposite ends of each muntin. At appropriate places in the side and bottom and top frame members, slots 51 (FIG. 2) are provided to receive these tongues to hold the muntins in place. As will be recognized from FIG. 1, the long muntins also are provided with such slots to receive the tongues from the short muntins 28.

It has been found that a particularly advantageous manufacturing technique is possible utilizing the plate removed from each door panel in the process of forming the opening to receive the light for the purpose of providing material for the frame and muntin members. This technique will be described in connection with FIG. 5 which shows a typical plate 55 removed in the process of forming the opening. In order to assist in the understanding of this technique, this method will be described by using reference numerals for the various components to be cut out of the plate and specific dimensions will be given. The technique is particularly usable with a door having an opening which is to be 35 7/16 (35.4375) inches in its vertical dimension and 23 7/16 (23.4375) inches in horizontal dimension. The plate itself is 33 ⅞ (33.875) inches in longer dimension and 21 ⅞ (21.875) inches in the shorter dimension. Since the opening is to be 35 7/16 (35.4375) inches tall, it is apparent that the vertical dimension of the plate is inadequate to supply a piece of material that long in a direction parallel with the side. However, by appropriately arranging the "pattern" of cuts on the plate as illustrated in FIG. 5, all such members can be obtained from this plate.

Figure 5:
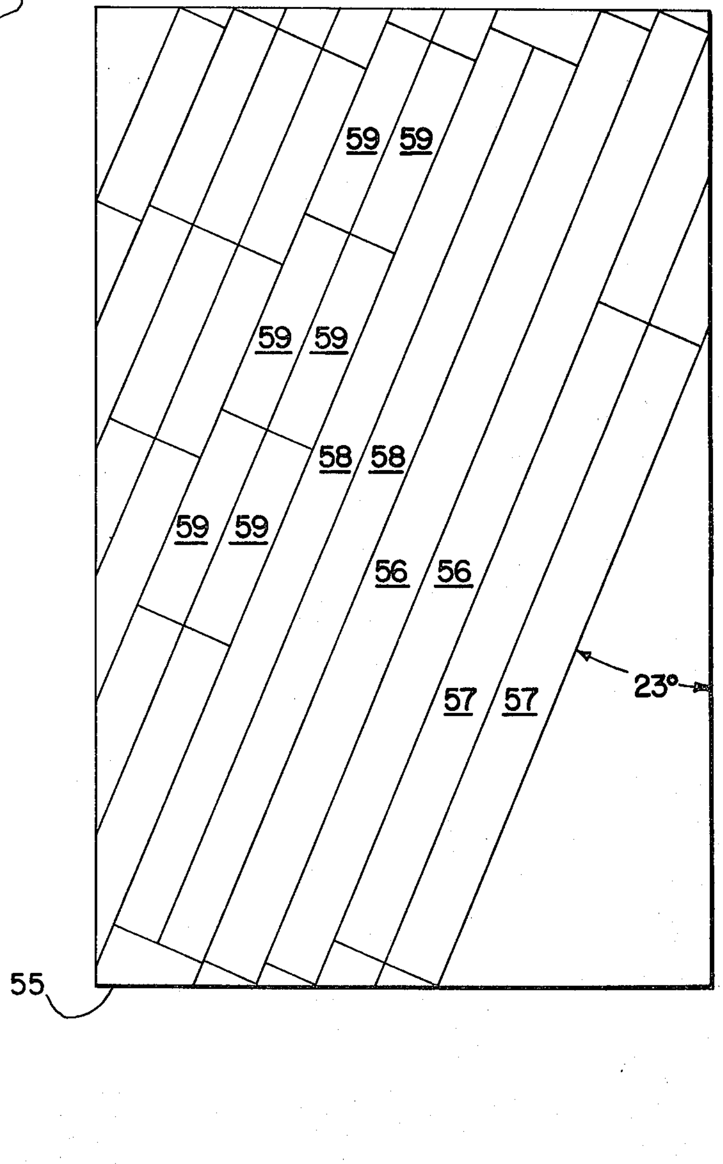
FIG. 5 is a plan view of a plate cut from a panel of the assembly of FIG. 1 showing the method of cutting the plate to provide material for the frame and muntin members.

Specifically, the vertical frame members, which are to be 35 7/16 (35.4375) inches in length and 2 7/16 (2.4375) in width, can be obtained by cutting strips 56 along lines which, as illustrated in FIG. 5, are at an angle of 23° with respect to the long dimension of the plate. The horizontal frame members can be obtained from strips 57, cut along lines parallel to the lines for the vertical frames, and the long muntins 27 can be obtained from strips 58. The horizontal frame members are to 23 7/16 (23.4375) inches×2 7/16 (2.4375) inches, and the long muntins are to be 33 ⅞ (33.875) inches×1 13/16 (1.8125). The short muntins can then be obtained from strips 59, each of the short muntin strips being 7 11/32 (7.34375)×1 13/16 (1.8125).

This technique not only obtains all of the frames and muntins, but also uses no additional material. The remaining portions of the plate can then be used to form the corner members 23, leaving still more material for other uses.

In the process of manufacturing the entire door assembly, the front and rear panels forming the major faces of the door are cut to provide plates 55 and the door panels are then bent to form the edge portions 32 and 33 and are assembled to each other with the sleeve 48 in place, after which the foam can be added. The panels 55 remove from the doors can then be cut into the strips described, and the individual strips are bent to form the frame and muntin members as well as the corner members previously described.

The final pre-assembly manufacturing step is then the provision for fasteners to hold the half-frame sections together. Each of the side members is provided with sockets with sockets 60 at spaced points along the inner surfaces of the face portins, each of these sockets being spot-welded in place. Each socket is a small cylindrical member with an interthreaded cavity. Preferably, at least one socket is attached to the inside surface of each side member in a location offset toward one end from the longitudinal center of the member, and a recessed or countersunk opening 61 is provided offset from the other end. Thus, in the assembled frame door structure, flat-head machine screws are passed through openings 61 and threaded into sockets 60 in the opposite side member, the directions of the screws alternating along each side of the frame. Thus, not all of the screw heads can be reached from either side, making the assembly secure. The screw head recesses are sufficiently deep to permit puttying the scres heads after installation providing an invisible screw head which contributes to the security. Joining of the two half-frames together, with the intermediate glazing, in the prepared door opening with fasteners 62, completes the assembly of the structure.

While certain advantageous embodiments have been chosen to illustrate the invention, it will be understood by those skilled in the art that various changes and modifications can be made therein without departing from the scope of the invention as defined in the appended claims.

What is claimed is:

1. A method of forming a door panel having an opening to receive a half-frame and muntins and of forming the half-frame and muntin members usable to retain a glass panel when assembled with a similar door panel and half-frame comprising the steps of

- cutting a rectangular plate from the door panel to form an opening therein;
- bending the edges of the door panel around the opening thus formed to provide an L-shaped retaining ledge at each side of the opening;
- cutting the plate from the door panel along diagonal parallel lines to provide elongated strips of suitable width to provide a pair of horizontal frame members, a pair of vertical frame members, a pair of long muntins and six short muntins;
- cutting the strips transversely into proper lengths for the frame and muntin members; and
- bending the frame and muntin members into desired cross-sectional shapes whereby the door panel and frame and muntin members are provided with minimum material waste.

2. A method according to claim 1 wherein the plate is cut along parallel lines which lie at an angle of 23° to the longer side of the rectangular plate.

* * * * *